(12) United States Patent
Hartular (10) Patent No.: US 7,719,236 B2
(45) Date of Patent: May 18, 2010

(54) PARALLEL POWERING OF PORTABLE ELECTRICAL DEVICES

(75) Inventor: Alexandru Hartular, San Jose, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 0 days.

(21) Appl. No.: 11/283,088

(22) Filed: Nov. 18, 2005

(65) Prior Publication Data

US 2006/0187689 A1 Aug. 24, 2006

Related U.S. Application Data

(60) Provisional application No. 60/654,750, filed on Feb. 18, 2005.

(51) Int. Cl.
H02J 7/04 (2006.01)
H02J 7/16 (2006.01)

(52) U.S. Cl. .................. 320/141; 320/140; 320/145; 307/66

(58) Field of Classification Search ................ 320/140, 320/141, 145; 307/66; 363/63
See application file for complete search history.

(56) References Cited

U.S. PATENT DOCUMENTS

| 5,723,970 | A | * | 3/1998 | Bell | 320/140 |
| 5,963,015 | A | * | 10/1999 | Lee | 320/128 |
| 5,969,438 | A | * | 10/1999 | Odaohara | 307/80 |
| 6,008,629 | A | * | 12/1999 | Saeki et al. | 320/140 |
| 6,118,254 | A | * | 9/2000 | Faulk | 320/141 |
| 6,337,563 | B2 | * | 1/2002 | Takimoto et al. | 323/284 |
| 7,157,810 | B2 | * | 1/2007 | Kanouda et al. | 307/66 |
| 7,245,469 | B2 | * | 7/2007 | Nemoto et al. | 361/65 |
| 2004/0012375 | A1 | * | 1/2004 | Bucur | 320/141 |

(Continued)

FOREIGN PATENT DOCUMENTS

| CN | 1531161 | 9/2004 |
| WO | 02093730 | 11/2002 |

OTHER PUBLICATIONS

English translation of Chinese Office Action issued in corresponding China Application No. 2006100072999 dated Jun. 8, 2007 (4 pages).

(Continued)

*Primary Examiner*—Edward Tso
*Assistant Examiner*—Ramy Ramadan
(74) *Attorney, Agent, or Firm*—Grossman, Tucker, Perreault & Pfleger, PLLC (57) ABSTRACT

A portable electrical device may include a DC to DC converter coupled to a common node, a load coupled to the common node, and a controller configured to control the DC to DC converter. The DC to DC converter may be configured to provide a charging current to a rechargeable battery from an adapter when the controller operates said DC to DC converter in a first adapter supply mode. The DC to DC converter may be configured to provide a battery supply current to the load via the common node when the controller operates the DC to DC converter in a second adapter supply mode. The adapter supply current and the battery supply current may add together at the common node to simultaneously provide a load supply current to the load in the second adapter supply mode.

20 Claims, 5 Drawing Sheets

U.S. PATENT DOCUMENTS

2004/0145348 A1* 7/2004 Bucur et al. ............... 320/128
2004/0178773 A1* 9/2004 Eguchi et al. ............... 320/140
2004/0207366 A1* 10/2004 Sung ........................ 320/140
2005/0001595 A1* 1/2005 May et al. .................. 320/140

OTHER PUBLICATIONS

English translation of Chinese Office Action issued in corresponding China Application No. 2006100072999 dated Dec. 10, 2007 (4 pages).

* cited by examiner

PARALLEL POWERING OF PORTABLE ELECTRICAL DEVICES

CROSS REFERENCE TO RELATED APPLICATIONS

This application claims the benefit of the filing date of U.S. Provisional Application Ser. No. 60/654,750, filed Feb. 18, 2005, the teachings of which are incorporated herein by reference.

FIELD

The present disclosure relates to portable electrical devices and, more particularly, to parallel powering of such devices.

BACKGROUND

A wide variety of portable electrical devices are available today including, but not limited to, laptop computers, personal digital assistants, mobile phones, and cordless power tools. Such portable electrical devices may utilize a rechargeable battery for providing power to operate the device in a battery supply mode. An adapter such as an ACDC or DCDC adapter may also be available to supply power to the portable electrical device in an adapter supply mode. The rechargeable battery may or may not be charged in the adapter supply mode depending on the presence and condition of the rechargeable battery. In some instances, it is advantageous to supply a system load of the portable electrical device with power from both the adapter and the rechargeable battery. To do so, some conventional embodiments have controlled the output voltage of the adapter but have not adjusted the output voltage of the rechargeable battery.

Accordingly, there is a need for adjusting the output voltage of a rechargeable battery to enable the rechargeable battery and adapter to simultaneously provided power to a load of the portable electrical device.

BRIEF SUMMARY OF THE INVENTION

According to one aspect of the invention, there is provided a portable electrical device.

The portable electrical device may include a DC to DC converter coupled to a common node, a load coupled to the common node, and a controller configured to control the DC to DC converter. The controller may be configured to control the DC to DC converter. The DC to DC converter may be configured to provide a charging current to a rechargeable battery from an adapter when the controller operates the DC to DC converter in a first adapter supply mode. The DC to DC converter may be configured to provide a battery supply current to the load via the common node when the controller operates the DC to DC converter in a second adapter supply mode.

According to another aspect of the invention, there is provided a system. The system may include an adapter and a portable electrical device. The portable electrical device includes a DC to DC converter coupled to a common node, a load coupled to the common node, and a controller configured to control the DC to DC converter. The DC to DC converter may be configured to provide a charging current to a rechargeable battery from the adapter when the controller operates the DC to DC converter in a first adapter supply mode. The DC to DC converter may be configured to provide a battery supply current to the load via the common node when the controller operates the DC to DC converter in a second adapter supply mode.

According to yet another aspect of the invention there is provided a method. The method may include: operating a DC to DC converter in a first adapter supply mode, the DC to DC converter configured to provide a charging current to a rechargeable battery in the first adapter supply mode; and operating the DC to DC converter in a second adapter supply mode, the DC to DC converter configured to provide a supply current to a system load via a common node in the second adapter supply mode, the system load coupled to the common node.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1A:
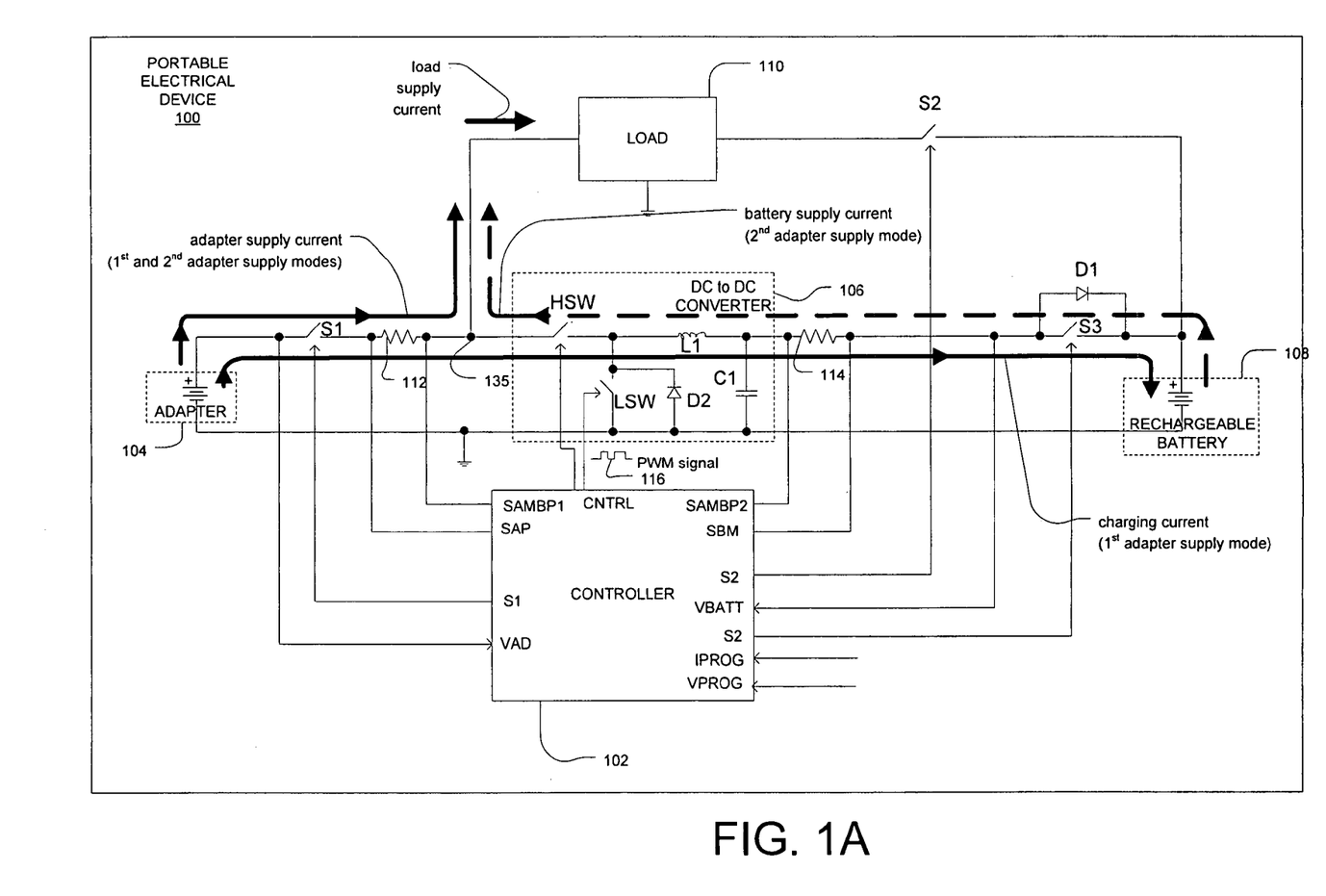
FIG. 1A is a diagram of a portable electrical device including a DC to DC converter and controller consistent with an embodiment for controlling the DC to DC converter.

FIG. 1A is a block diagram of a portable electrical device 100. The portable electrical device 100 may include, but not be limited to, laptop computers, personal digital assistants, mobile phones, and cordless power tools. The portable electrical device 100 may include an adapter 104, a rechargeable battery 108, a load 110, a DC to DC converter 106, and a controller 102. In general, the controller 102 may be configured to control the DC to DC converter 106 to operate in two different adapter supply modes when the adapter 104 and rechargeable battery 108 are present.

In a first adapter supply mode, the DC to DC converter 106 may be configured to provide a charging current to the rechargeable battery 108. In a second adapter supply mode, the DC to DC converter 106 may be configured to provide a battery supply current to the system load 110 via the common node 135. In both the first and second adapter supply modes, the adapter 104 may provide an adapter supply current to the system load 110 via the common node 135. In the second adapter supply mode, the adapter supply current and the battery supply current may be simultaneously provided such that the adapter supply current and the battery supply current add together at the common node 135 to provide a load supply current to the load 110.

The adapter 104 may include an ACDC adapter or a DCDC adapter to supply power to the portable electrical device and/or to provide power to charge the rechargeable battery 108. Although shown internal to the portable electrical device 100, the adapter 104 may also be external to the portable electrical device 100. The rechargeable battery 108 may be of a variety of chemistries including, but not limited to, lithium-ion, nickel-cadmium, and nickel-metal hydride. The rechargeable battery 108 may also be included as part of a rechargeable battery pack. The load 110 may represent one or more loads or the entire system load of the portable electrical device 100.

The DC to DC converter 106 may be a synchronous rectifier converter including a high side switch HSW, a low side switch LSW, an inductor L1, and an output capacitor C1. In one embodiment, the DC to DC converter 106 may also include a diode D2 in parallel with the low side switch LSW. The high side switch HSW and low side switch LSW may be any variety of transistors including, but not limited to, metal oxide semiconductor field effect transistors (MOSFETs) such as a p-channel MOSFET (PMOS) or n-channel MOSFET (NMOS).

The controller 102 may accept a variety of input signals representative of power conditions of various components and representative of instructions regarding desired charging conditions. In response to these input signals, the controller 102 may provide output signals to control the DC to DC converter 106 and the state of various switches such as switches S1, S2, and S3. Some input signals to the controller 102 may be provided by sense resistors 112 and 114 and may be representative of particular current levels. For instance, the SAMBP1 and SAP terminals of the controller 102 may be coupled across the sense resistor 112 so that the voltage drop across the sense resistor 112 may provide a signal proportional to the adapter supply current flowing from the adapter 104. In addition, the SAMBP2 and SBM terminals of the controller 102 may be similarly coupled across the sense resistor 114 so that the voltage drop across the sense resistor 114 may provide a signal proportional to a charging current flowing from the adapter 104 to the rechargeable battery 108 during the first adapter supply mode.

Other input signals to the controller 102 may be representative of a voltage level. For instance, the VAD terminal of the controller 102 may accept an input signal representative of the voltage level of the adapter 104, and the VBATT terminal of the controller 102 may accept an input signal representative of the voltage level of the rechargeable battery 108. The IPROG terminal may accept an analog input signal representative of a desired charging current and the VPROG terminal may accept an analog input signal representative of a desired charging voltage. The analog signals provided to the IPROG and VPROG terminals may be provided by any variety of components of the portable electrical device 100. In one embodiment where the portable electrical device 100 includes a keyboard controller, the keyboard controller may incorporate at least to digital two analog converters (DACs) to provide the analog signals to the IPROG and VPROG terminals.

Switches S1, S2, and S3 may be implemented in variety of fashions to accomplish the functionality described herein. Switch S1 may be referred to as an adapter switch which may turn ON and OFF as controlled by the controller 102 depending on, but not limited to, the presence of the adapter 104 having a suitable output voltage as monitored by the controller 102 via the VAD terminal. Switch S2 may be referred to as a battery switch which may turn ON and OFF as controlled by the controller 102 depending on, but not limited to, the presence of a rechargeable battery 108 having a suitable output voltage as monitored by the controller 102 via the VBATT terminal. Switch S3 may be referred to herein as a charging switch and may be coupled to the path between the DC to DC converter 106 and the rechargeable battery 108. The charging switch S3 may be operable in both a unidirectional state and bidirectional state. In a bidirectional state the charging switch S3 may permit a charging current to flow to the rechargeable battery 108 from the DC to DC converter 106 in the first adapter supply mode and may permit a battery supply current to flow from the rechargeable battery 108 to the load 110 via the common node 135 in the second adapter supply mode.

In a battery supply mode, an adapter 104 of suitable voltage level may not be present and a battery 108 of suitable voltage level may be present. The controller 102 may sense these respective conditions from the VAD and the VBATT terminals. The controller 102 may then instruct the adapter switch S1 and the charging switch S3 to be OFF and the battery switch S2 to be ON. Accordingly, battery current would flow through the battery switch S2 to the load 110 from the rechargeable battery 108 in this battery supply mode.

In the first or second adapter supply modes, an adapter 104 of suitable voltage may be present and a rechargeable battery may also be present. The presence of the adapter 104 may be sensed by the controller 102 via the VAD terminal and the presence of the rechargeable battery 108 may be sensed by the controller 102 via the VBATT terminal. In the first and second adapter supply modes, the controller 102 may instruct the adapter switch S1 to be ON and the battery switch S2 to be OFF.

In the first adapter supply mode, the rechargeable battery 108 may require a charging current and the load 110 may not require a power or current level in excess of the maximum power or current limit of the adapter 104. The current provided by the adapter 104 may then split at the common node 135 to provide and adapter supply current to the load 110 and a charging current to the rechargeable battery 108.

In the second adapter supply mode, the output of the rechargeable battery 108 and the adapter 104 may be coupled in parallel to the common node 135 to enable the rechargeable battery 108 and the adapter 104 to simultaneously provide power to the load 110. The controller 102 may switch the DC to DC converter 106 from the first adapter supply mode to the second adapter supply mode when the current draw requirement of the load 110 exceeds the maximum available current limit of the adapter 104. Therefore, in the second adapter supply mode the adapter supply current and the battery supply current may be simultaneously provided such that the adapter supply current and the battery supply current add together at the common node 135 to provide a load supply current to the load 110.

Figure 1B:
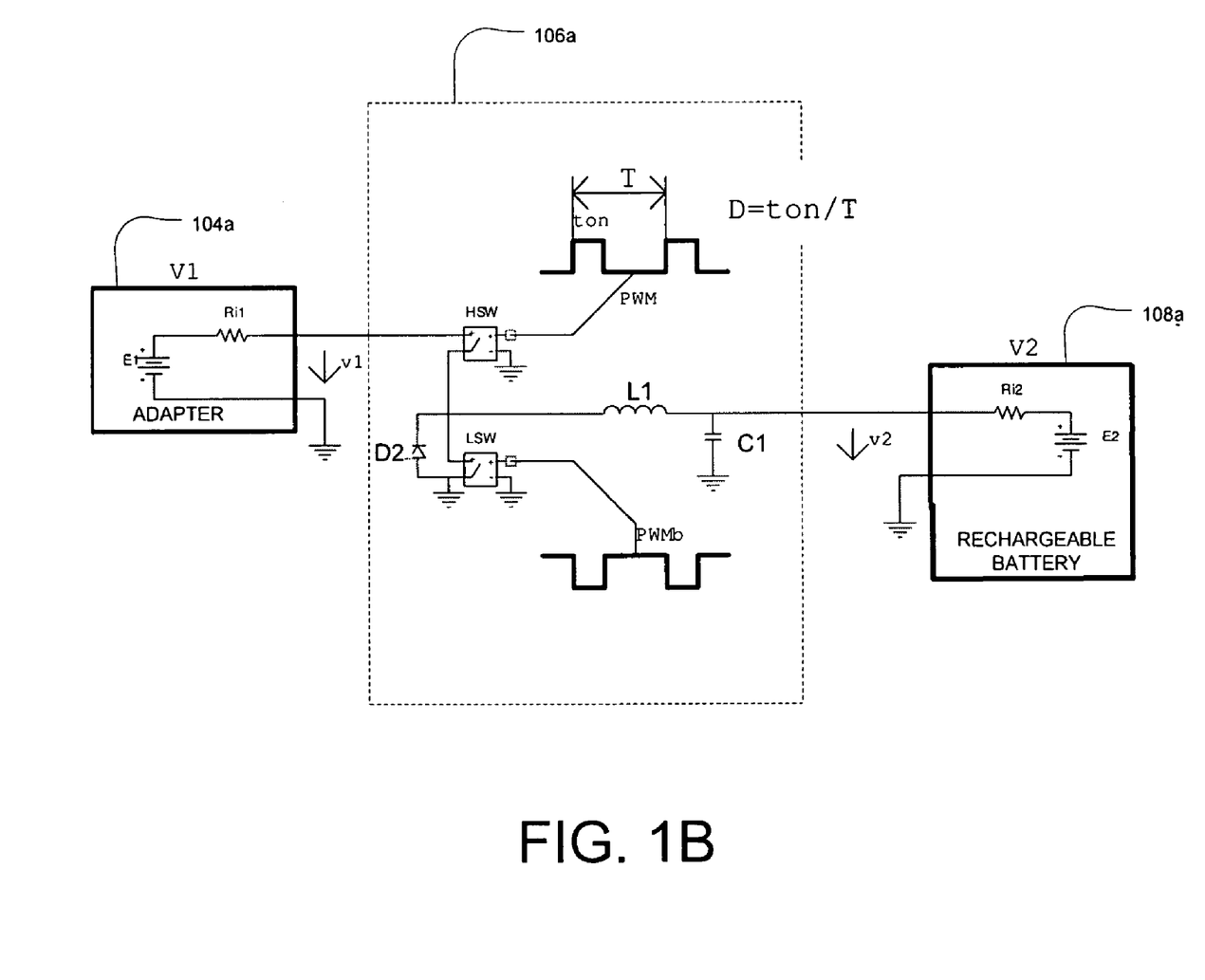
FIG. 1B is a diagram of an embodiment of the DC to DC converter of FIG. 1A.

Other embodiments, e.g., some single battery embodiments, may not utilize the charging switch S3 and accompanying diode D1 of FIG. 1A or may keep the charging switch S3 in a bidirectional state to permit current flow in either direction through the switch S3. FIG. 1B illustrates an embodiment 106a of the DC to DC converter of FIG. 1A where the charging switch S3 and accompanying diode D1 of FIG. 1A are not utilized or the switch S3 is ON in a bidirectional state effectively bypassing the diode D1. The DC to DC converter 106a may be a synchronous rectifier converter including high side switch HSW, low side switch LSW, diode D2, inductor L1, and capacitor C1.

In the embodiment of FIG. 1B, the controller may instruct the low side switch LSW to remain OFF in the first adapter supply mode when a charging current is provided to the rechargeable battery 108. The synchronous rectifier converter 106a may therefore function as a conventional buck converter utilizing the high side switch HSW, diode D2, inductor L1, and capacitor C1 in the first adapter supply mode. The DC to DC converter 106a operating as a conventional buck converter may allow current (charging current) to flow in one direction towards the rechargeable battery 108, but not in the other direction towards the common node 135. In the second adapter supply mode, the high and low side switches HSW, LSW may both be responsive to the pulse with modulated (PWM) signal 116 provided by the controller to function as a boost converter to provide the battery supply current to the common node 135.

In the embodiment of FIG. 1B, the adapter 104*a* may be represented as a power source V1 having an ideal voltage source E1 and an internal resistance Ri1. The rechargeable battery 108*a* may be represented as a power source V2 having an ideal voltage source E2 and an internal resistance Ri2. The voltage v1 may represent the voltage at the source terminals of the adapter 104*a* and the voltage v2 may represent the voltage at the source terminals of the rechargeable battery 108*a*. If E1>E2 and v1>v2, then consider two cases 1) when the duty cycle (D) of the PWM signal 116 is greater than E2/E1 and 2) when the duty cycle D is less than E2/E1.

When D>E2/E1, the synchronous rectifier converter would work as a buck (step-down) converter having an input voltage of v1 and an output voltage of v2. The power would be transferred from the adapter 104*a* to the rechargeable battery 108*a* and may have a value equal to I2=(v2−E2)/Ri2, where I2 is the charging current provided to the battery, v2 is the voltage at the source terminals of the battery, E2 is the ideal voltage source of the battery, and Ri2 is the internal resistance of the battery. In addition, v2=v1*D, where D is the duty cycle of the PWM signal.

When D<E2/E1, the synchronous rectifier converter would work as a boost (step-up) converter having an input voltage of v2 and an output voltage of v1. The power would be transferred from the battery 108*a*. The battery supply current would flow toward V1 any may have a value equal to I1=(v1−E1)/Ri1, where I1 is the battery supply current, v1 is the voltage at the source terminals of the adapter, E1 is the ideal voltage source of the adapter, and Ri1 is the internal resistance of the adapter.

Figure 2:
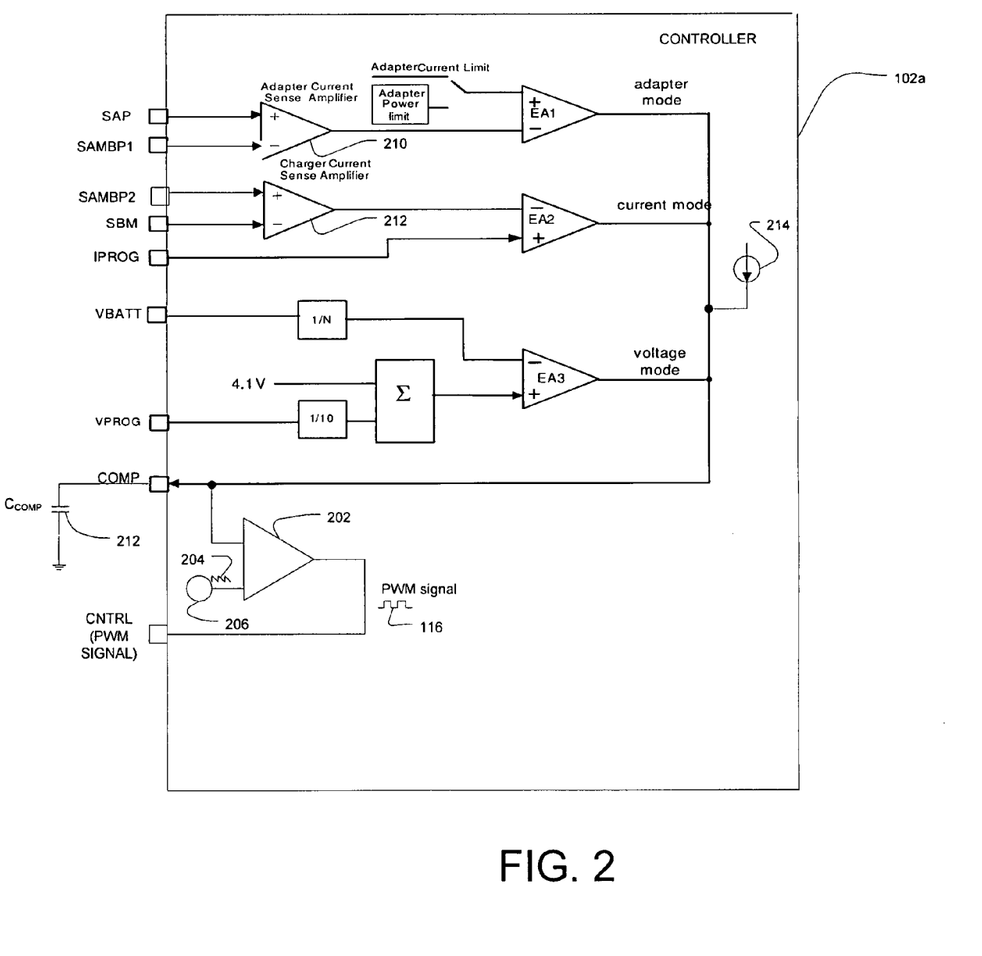
FIG. 2 is a diagram of the controller of FIG. 1A.

FIG. 2 illustrates an embodiment 102*a* of the controller 102 of FIG. 1A. The controller 102*a* may include a sense amplifier 210 to amplify the voltage drop across the sense resistor 112 representative of the adapter current from the adapter 104. The output of the sense amplifier 210 may be provided to the first error amplifier EA1. The first error amplifier EA1 may compare the output of the sense amplifier 210 with a threshold representative of a maximum power limit of the adapter 104. The first error amplifier EA1 may also compare the output of the sense amplifier 210 with a threshold representative of a maximum current limit of the adapter 104. The controller 102*a* may also include another sense amplifier 212 to amplify the voltage drop across the sense resistor 114 representative of the charging current to the battery 108 when the battery is charging in the first adapter supply mode. The output of the sense amplifier 212 may be provided to the second error amplifier EA2 for comparison to a charging current limit as provided via the IPROG terminal. A third error amplifier EA3 may compare a signal representative of the charging voltage with the analog voltage signal input the VPROG terminal representative of a desired charging voltage. A comparator 202 may compare the analog voltage signal at the COMP pin with a periodic signal at a fixed frequency such as a ramp signal 204 provided by the signal generator 206 and provide an output pulse width modulated (PWM) signal having a duty cycle depending on the value of the intersection of the COMP signal with the ramp signal.

If any of the limits monitored by the three error amplifiers EA1, EA2, EA3 is exceeded, that particular error amplifier would control the loop and would reduce the analog voltage at the COMP pin to reduce the duty cycle of the PWM signal 116. The analog voltage at the COMP pin may be reduced by the current sunk through the output of the error amplifier controlling the loop (e.g., error amplifier EA1, EA2, or EA3) and increased by the current source 214 forcing current in Ccomp 212. When the analog voltage at the COMP pin decreases the DC to DC converter's output voltage also decreases. Accordingly, the charging current provided to the rechargeable battery 108 would be reduced.

In the first adapter supply mode, the adapter 104 may simultaneously provide an adapter supply current to the load 110 via the common node 135 and a charging current to the rechargeable battery 108 via the DC to DC converter 106. If the adapter limit monitored by the error amplifier EA1 is exceeded, the charging current to the battery may be reduced to serve the increasing power requirement of the load 110. That is, powering the load 110 always takes priority over charging the rechargeable battery 108 during the first adapter supply mode. For example, if the load 110 requires more current while the battery is receiving a charging current, the charging current to the rechargeable battery 108 may be reduced to meet the demands of the load 110.

The controller 102 may also operate the DC to DC converter 106 in a second adapter supply mode where the DC to DC converter 106 is configured to supply a battery supply current to the load 110 via the common node 135. The battery supply current provided to the load 110 in this instance may flow in an opposite direction as the charging current that flows towards the rechargeable battery 108 as illustrated in FIG. 1A. The output of the DC to DC converter 106 in the second adapter supply mode may be in parallel with the adapter 104 to enable the adapter 104 to provide the adapter supply current to the load 110. The adapter supply current may be a fraction of the entire load supply current provided to the load 110. The remainder of the load supply current may be provided by the battery supply current via the node 135 when the DC to DC converter is operating in the second adapter supply mode. In other words, the adapter supply current and the battery supply current may add together to provide the load supply current to the load 110.

The controller 102 may sense the output current of the adapter 104 and switch the DC to DC converter 106 from operation in the first supply mode to operation in the second supply mode when a current requirement of the load 110 exceeds a maximum current limit of the adapter 104. For example, in the first supply mode the adapter 104 may provide power to both the load 110 and the rechargeable battery 108. As the current (power) requirement of the load 110 increases, an adapter limit may be reached as sensed by the first error amplifier EA1. Hence, the adapter control loop including the first error amplifier EA1 may reduce the analog voltage at the COMP pin thereby reducing the duty cycle of the PWM signal 116 to reduce the charging current to the rechargeable battery 108 so more is available to serve the load 110. The charging current may continue to be decreased as current requirements of the load 110 increase until finally the charging current is reduced to zero. At this point if the load 110 current demands still continued to increase and parallel powering via the second supply mode is not enabled, the internal protections of the adapter 104 may shut down the adapter 104.

The controller 102 consistent with an embodiment may be able to detect when the first error amplifier EA1 is controlling the duty cycle of the PWM signal 116 and the charging current becomes zero and force the switch S3 from a unidirectional state to a bidirectional state at that time. When the charging switch S3 is in the bidirectional state and ON, current flow is permitted in either direction. The DC to DC converter as a synchronous rectifier converter may start to boost the battery voltage so that a battery supply current may be provided from an output of the synchronous rectifier converter towards the common node 135 when the duty cycle of the PWM signal is below a threshold level.

This threshold level may be about equal to a voltage of the rechargeable battery divided by a voltage of the adapter. If the duty cycle of the PWM signal 116 is greater than this threshold level, the synchronous rectifier converter may act as a buck converter to buck an input voltage provided by the adapter 104 and to provide a charging current to the rechargeable battery 108. If the duty cycle of the PWM signal 116 is less than this threshold, the synchronous rectifier converter may act as a boost converter to boost a voltage of the rechargeable battery 108 to provide a supply current to the load 110 via the node 135. The adapter voltage is typically greater than the battery voltage so the battery voltage would need to be boosted in the second adapter supply mode in order to supply the load 110 any power (or current) out of the rechargeable battery 108 in excess of the adapter power (or current) limit. Through this operation, the adapter mode control loop would maintain the voltage drop on the sense resistor 112 at a limit level so that the adapter supply current would keep flowing out of the adapter 104 (no inter-current flow) but would not exceed the associated maximum adapter limit. The battery supply current provided by the battery 108 to the load 110 via the synchronous rectifier converter may then flow out of the battery through the charging switch S3 functioning in the bidirectional state in this instance.

Figure 3:
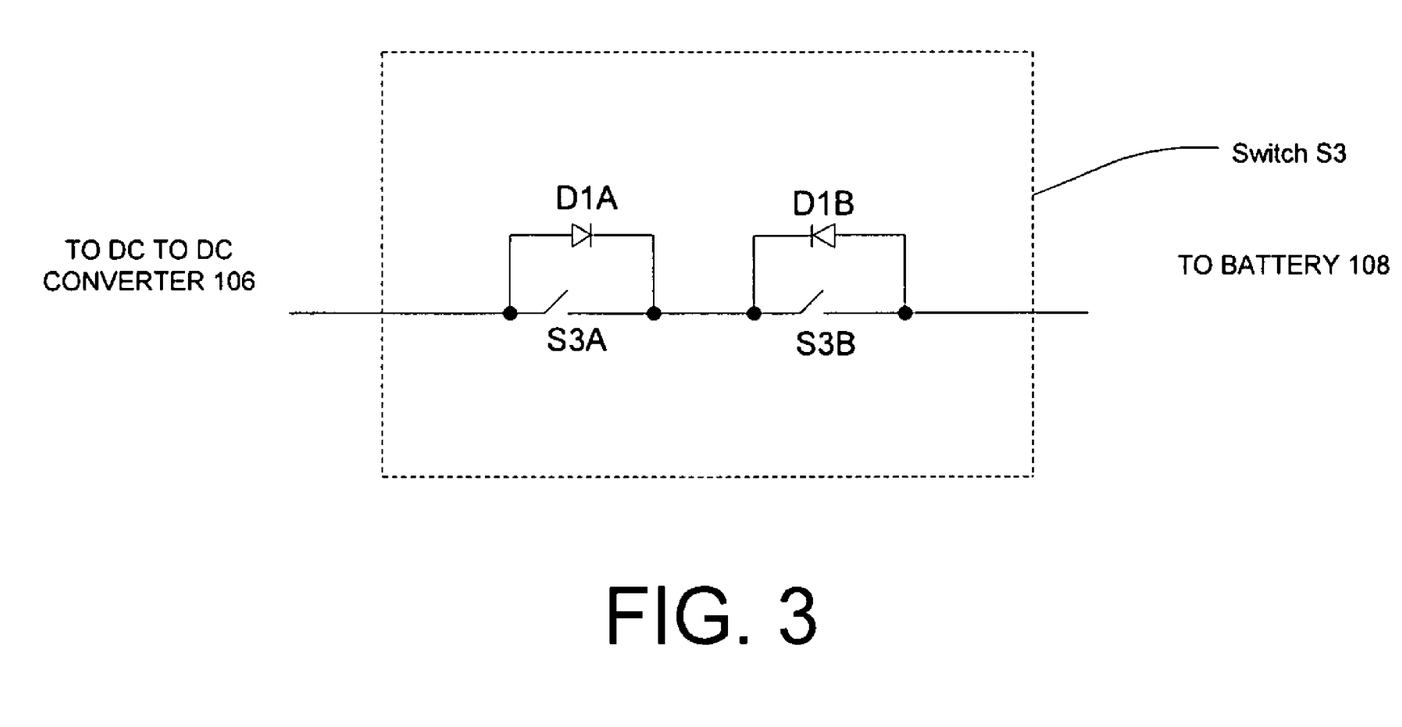
FIG. 3 is a diagram of an embodiment of the charging switch of FIG. 1A operable in both a unidirectional and bidirectional state.

FIG. 3 illustrates one embodiment of the charging switch S3 that may function in a unidirectional state and in a bidirectional state. Such a switch S3 may be implemented in a variety of other fashions as well. The charging switch S3 of FIG. 3 may include switches S3A and S3B. Diode D1A may be coupled in parallel with switch S3A and may be in reverse bias with the battery. Diode D1B may be coupled in parallel with switch S3B and may in forward bias with the battery. When in the unidirectional state, the controller 102 may maintain switch S3B ON. Current from the battery would be blocked by the diode D1A. When changing from the unidirectional state to the bidirectional state, the controller may instruct both switches S3A and S3B to be closed thereby permitting current flow in both directions.

Figure 4:
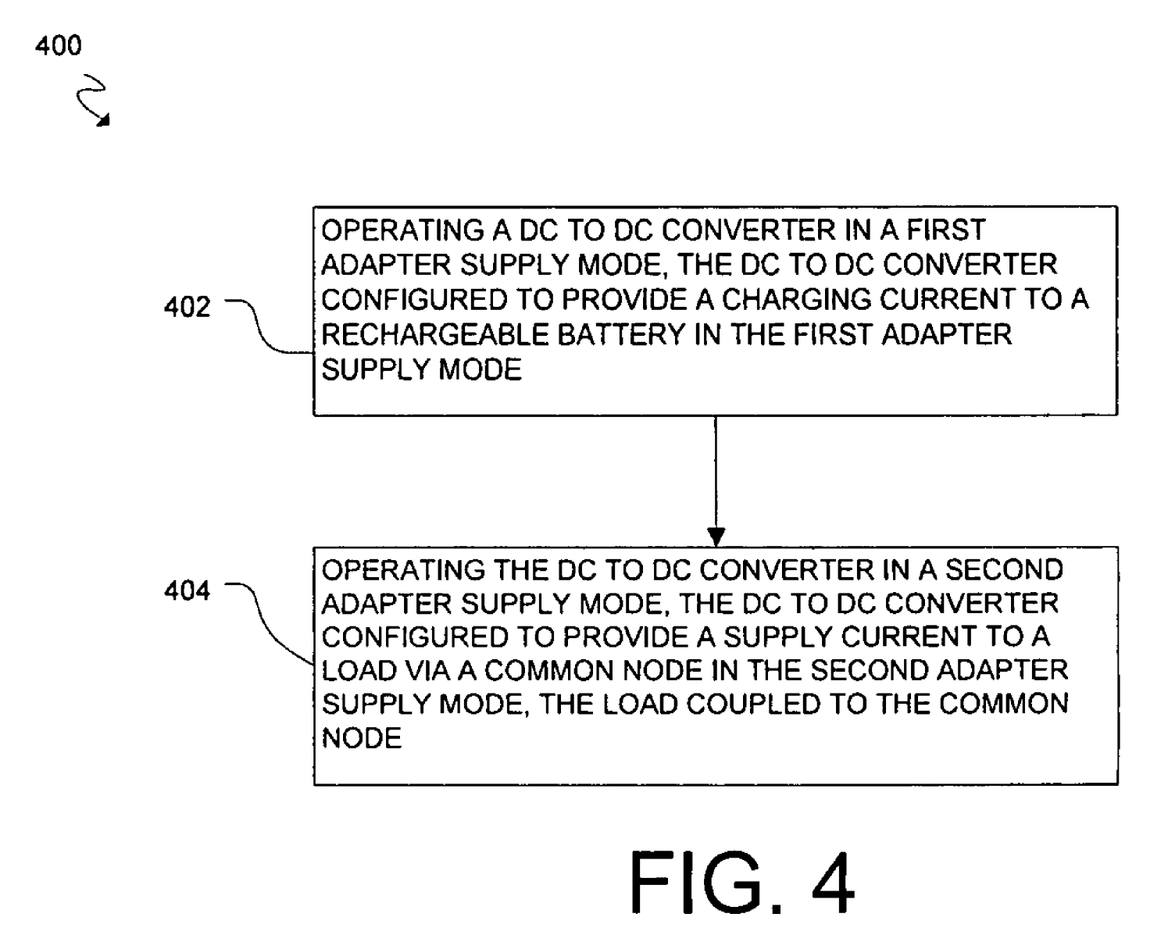
FIG. 4 is a flow chart of operations consistent with an embodiment.

FIG. 4 illustrates operations 400 according to an embodiment. Operation 402 may include operating a DC to DC converter in a first supply mode, the DC to DC converter configured to provide a charging current to a rechargeable battery in the first supply mode. Operation 404 may include operating the DC to DC converter in a second supply mode, the DC to DC converter configured to provide a supply current to a load via a common node in the second supply mode, the load coupled to the common node.

Advantageously, the output voltage of the battery may be boosted to enable the battery and adapter to both simultaneously provide power to the system load in the second adapter supply mode. Therefore, the adapter 104 need not be oversized compared to the maximum power requirements of the system load 110. Therefore, the adapter may be smaller, lighter, less cumbersome, and less expensive than a conventional oversized adapter.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible.

What is claimed is:

1. A portable electrical device comprising:
   a DC to DC converter coupled to a common node;
   a load coupled to said common node; and
   a controller configured to control said DC to DC converter, said DC to DC converter configured to provide a charging current to a rechargeable battery from an adapter when said controller operates said DC to DC converter in a first adapter supply mode, said DC to DC converter further configured to provide a battery supply current from said battery to said load via said common node when said controller operates said DC to DC converter in a second adapter supply mode;
   wherein said battery supply current and an adapter supply current provided by said adapter are simultaneously provided in said second adapter supply mode, said adapter supply current and said battery supply current adding together at said common node to provide a load supply current to said load in said second adapter supply mode;
   wherein said adapter supply current and said battery supply current are simultaneously provided in said second adapter supply mode in response to a single pulse width modulated signal and its complement provided by said controller to said DC to DC converter; and
   wherein the output of said rechargeable battery is controlled by the DC to DC converter in said second adapter supply mode.

2. The portable electrical device of claim 1, wherein said controller includes a first error amplifier configured to receive an adapter current sense amplifier output from an adapter current sense amplifier and to compare said adapter current sense amplifier output with a threshold representative of a maximum power limit of said adapter, said controller further including a second error amplifier configured to receive a charger sense amplifier output from a charger sense amplifier and to compare said charger sense amplifier output with a charging current limit.

3. The portable electric device of claim 1, wherein said controller is configured to sense said adapter supply current of said adapter, wherein said controller switches said DC to DC converter from operation in said first adapter supply mode to operation in said second adapter supply mode when a current requirement of said load exceeds a maximum current limit of said adapter.

4. The portable electrical device of claim 1, wherein said controller is configured to operate said DC to DC converter as a buck converter in said first adapter supply mode to buck an input voltage provided by said adapter and said controller is further configured to operate said DC to DC converter as a boost converter in said second adapter supply mode to boost a voltage of said rechargeable battery.

5. The portable electrical device of claim 1, wherein said DC to DC converter comprises a synchronous rectifier converter having a high side switch and a low side switch, said controller configured to operate said synchronous rectifier converter as a buck converter in said first adapter supply mode to buck an input voltage provided by said adapter, said controller further configured to operate said synchronous rectifier as a boost converter in said second adapter supply mode to boost a voltage of said rechargeable battery.

6. The portable electrical device of claim 5, wherein said synchronous rectifier converter is configured to operate as said boost converter in said second adapter supply mode if a duty cycle of said pulse width modulated signal provided by said controller is less than a threshold level.

7. The portable electrical device of claim 6, wherein said threshold level is about equal to a voltage of said rechargeable battery divided by a voltage of said adapter.

8. A system comprising:
an adapter; and
a portable electrical device comprising:
- a DC to DC converter coupled to a common node;
- a load coupled to said common node; and
- a controller configured to control said DC to DC converter, said DC to DC converter configured to provide a charging current to a rechargeable battery from said adapter when said controller operates said DC to DC converter in a first adapter supply mode, said DC to DC converter configured to provide a battery supply current from said battery to said load via said common node when said controller operates said DC to DC converter in a second adapter supply mode;
- wherein said adapter is configured to provide an adapter supply current in said second adapter supply mode, said adapter supply current and said battery supply current being simultaneously provided in said second adapter supply mode, said adapter supply current and said battery supply current adding together at said common node to provide a load supply current to said load in said second adapter supply mode;
- wherein said adapter supply current and said battery supply current are simultaneously provided in said second adapter supply mode in response to a single pulse width modulated signal and its complement provided by said controller to said DC to DC converter; and
- wherein the output of said rechargeable battery is controlled by the DC to DC converter in said second adapter supply mode.

9. The system of claim 8, wherein said adapter includes a first error amplifier configured to receive an adapter current sense amplifier output from an adapter current sense amplifier and to compare said adapter current sense amplifier output with a threshold representative of a maximum power limit of said adapter, said controller further including a second error amplifier configured to receive a charger sense amplifier output from a charger sense amplifier and to compare said charger sense amplifier output with a charging current limit.

10. The system of claim 8, wherein said controller is configured to sense said adapter supply current of said adapter, wherein said controller switches said DC to DC converter from operation in said first adapter supply mode to operation in said second adapter supply mode when a current requirement of said load exceeds a maximum current limit of said adapter.

11. The system of claim 8, wherein said controller is configured to operate said DC to DC converter as a buck converter in said first adapter supply mode to buck an input voltage provided by said adapter and said controller is further configured to operate said DC to DC converter as a boost converter in said second adapter supply mode to boost a voltage of said rechargeable battery.

12. The system of claim 8, wherein said DC to DC converter comprises a synchronous rectifier converter having a high side switch and a low side switch, said controller configured to operate said synchronous rectifier converter as a buck converter in said first adapter supply mode to buck an input voltage provided by said adapter, said controller further configured to operate said synchronous rectifier as a boost converter in said second adapter supply mode to boost a voltage of said rechargeable battery.

13. The system of claim 12, wherein said synchronous rectifier converter is configured to operate as said boost converter in said second adapter supply mode if a duty cycle of said pulse width modulated signal provided by said controller is less than a threshold level.

14. A method comprising:
- operating a DC to DC converter in a first adapter supply mode, said DC to DC converter configured to provide a charging current to a rechargeable battery from an adapter in said first adapter supply mode; and
- operating said DC to DC converter in a second adapter supply mode, said DC to DC converter configured to provide a battery supply current from said battery to a load via a common node in said second adapter supply mode, said load coupled to said common node;
- simultaneously providing said battery supply current and an adapter supply current provided by said adapter in said second adapter supply mode, said adapter supply current and said battery supply current adding together at said common node to provide a load supply current to said load in said second adapter supply mode;
- wherein said adapter supply current and said battery supply current are simultaneously provided in said second adapter supply mode in response to a single pulse width modulated signal and its complement provided by a controller to said DC to DC converter; and
- wherein the output of said rechargeable battery is controlled by the DC to DC converter in said second adapter supply mode.

15. The method of claim 14, wherein said controller includes a first error amplifier configured to receive an adapter current sense amplifier output from an adapter current sense amplifier and to compare said adapter current sense amplifier output with a threshold representative of a maximum power limit of said adapter, said controller further including a second error amplifier configured to receive a charger sense amplifier output from a charger sense amplifier and to compare said charger sense amplifier output with a charging current limit.

16. The method of claim 14, further comprising:
- sensing said adapter supply current of said adapter; and
- switching said DC to DC converter from operation in said first adapter supply mode to operation in said second adapter supply mode when a current requirement of said load exceeds a maximum current limit of said adapter.

17. The method of claim 14, wherein said DC to DC converter comprises a synchronous rectifier converter, said synchronous rectifier converter operating as a buck converter in said first adapter supply mode to buck an adapter voltage provided by said adapter and said synchronous rectifier converter operating as a boost converter in said second adapter supply mode to boost a battery voltage provided by said rechargeable battery.

18. The method of claim 17, wherein said synchronous rectifier converter operates as said boost converter if a duty cycle of said pulse width modulated signal is less than a threshold level, said threshold level about equal to a voltage of said rechargeable battery divided by a voltage of said adapter.

19. The portable electrical device of claim 1, wherein said controller is configured to switch a switch operatively coupling said rechargeable battery to said DC to DC converter between a unidirectional state and a bidirectional state, depending on whether operating in said first or second adapter supply modes.

20. The portable electrical device of claim 8, wherein said controller is configured to switch a switch operatively coupling said rechargeable battery to said DC to DC converter between a unidirectional state and a bidirectional state, depending on whether operating in said first or second adapter supply modes.

* * * * *